United States Patent [19]

Rasen et al.

[11] 4,177,312
[45] Dec. 4, 1979

[54] MATTING ARTICLE

[75] Inventors: Alfred Rasen; Rolf Vollbrecht; Klemens Schenesse, all of Obernburg, Fed. Rep. of Germany

[73] Assignee: Akzona Inc., Asheville, N.C.

[21] Appl. No.: 903,552

[22] Filed: May 8, 1978

[51] Int. Cl.$^2$ .............................................. B32B 7/00
[52] U.S. Cl. ................................... 428/284; 156/167; 156/176; 156/423; 428/287; 428/288; 428/296; 428/297; 428/298; 428/302; 428/303
[58] Field of Search ............... 156/167, 168, 176, 178, 156/179, 423; 428/182, 183, 195, 198, 284, 286, 288, 296, 297, 298, 302, 303, 304, 306, 308, 287

[56] References Cited

U.S. PATENT DOCUMENTS

| | | | |
|---|---|---|---|
| 3,565,729 | 2/1971 | Hartmann | 156/167 |
| 3,654,063 | 4/1972 | Blackburn et al. | 428/182 |
| 3,676,239 | 7/1972 | Soehngen | 156/167 |
| 3,687,759 | 8/1972 | Werner et al. | 156/167 |
| 3,775,210 | 11/1973 | Paquette et al. | 156/178 |
| 3,802,980 | 4/1974 | Harman | 156/178 |
| 3,837,988 | 9/1974 | Hennen et al. | 156/167 |
| 4,055,268 | 8/1977 | Barthel | 428/296 |

Primary Examiner—James J. Bell
Attorney, Agent, or Firm—John H. Shurtleff

[57] ABSTRACT

An improved coherently bonded, low density matting article composed of a primary matting layer in which synthetic fiber-forming thermoplastic macrofilaments are irregularly looped and intermingled in a highly porous or open peak and valley three-dimensional sheet structure, preferably having peaks, humps or projections in a waffle-like pattern, and a secondary footing layer or "sole" applied and fused or bonded by its surface filaments to some of the filaments in the peak portions on one face of the primary matting layer. A special process and apparatus are provided to produce this matting article wherein transverse strength is increased while maintaining a low apparent density and further improving its filling characteristics for use as a soil retention matting.

10 Claims, 7 Drawing Figures

MATTING ARTICLE

The present invention is a specific improvement over our U.S. copending application, Ser. No. 703,277, filed July 7, 1976. Because the subject matter of this earlier application is part of the present invention, it is incorporated herein by reference as fully as if set forth in its entirety.

Briefly, our earlier application, Ser. No. 703,277, relates to a low density matting article and a process for its production. The matting article, which is highly porous and has a thickness of about 5–70 mm, consists of a plurality of continuous melt-spun synthetic polymer filaments of a diameter of 0.1 to 1.5 mm which have been laid in overlapping rows of irregularly looped and intermingled filaments to form a peak and valley three-dimensional structure undulating in the longitudinal and/or transverse directions of the matting, preferably with undulations or humps in both directions to provide a waffle-like face structure on the matting sheet. The individual filaments in this matting structure are self-bonded at random points of intersection, without a binder or bonding agent, to provide a transverse strength per unit of surface weight of at least 2 Nm/g, preferably at least 4 Nm/g. The density of the matting article is usually expressed as its surface weight per unit of its thickness, i.e. the surface weight for a standard thickness of one meter, which is desirably less than 50,000 g/m$^3$, and preferably less than 40,000 g/m$^3$.

While the earlier application offers a very useful matting article, a higher transverse strength without any additional impregnation of a binder became desirable, for example on the basis of achieving a higher strength at the fused or self-bonded points of intersection. A high transverse strength is advantageous in soil retention applications such as a protection matting for embankments, a reinforcement matting for dikes, shores or the like, where the low density matting is laid out on a sloping surface and suitably filled with sand, gravel, soil, fertilizer, seeds or other fillers. Furthermore, the matting should have a relatively low (apparent) density, i.e. a low surface weight per unit thickness, and a correspondingly high filling volume. Finally, by providing a special surface structure, the matting should be capable of being easily filled when laid in position.

The definition of "transverse strength" and its measurement have been set forth in detail on pages 6 and 7 of said copending application, Ser. No. 703,277, i.e. transverse strength being in units of newtons/meter (N/m) and ordinarily given as the "specific transverse strength" or "transverse strength per unit of surface weight" (Nm/g). The same meanings and definitions are adopted for the present application.

Self-bonded matting articles made with macrofilaments, i.e. synthetic melt-spun polymer filaments with a diameter of about 0.1 to 1.5 mm., have been disclosed in the German patent applications DT-OS Nos. 1,810,921 and 1,922,460; see also U.S. Pat. Nos. 3,686,049; 3,691,004; and 3,837,988. By comparison, our own earlier developed matting in said Ser. No. 703,277, represents a significant departure from the prior art where we first found it possible to provide a highly open or porous matting having a proportion of voids of more than 95% together with a transverse strength per unit of surface weight of more than 2 Nm/g while maintaining the surface weight per unit thickness to something less than 50,000 and preferably less than 40,000 g/m$^3$.

It is an object of the present invention to provide a further improved low density matting having better filling and soil retention characteristics and a greater transverse strength per unit of surface weight without losing the advantage of a very low apparent density, measured as the surface weight per unit thickness. Moreover, such objects and advantages are to be achieved without using binders or special bonding agents or adhesives and without inserting reinforcing grids, meshes, screens or the like.

It is a further object of the invention to provide a process and apparatus for the manufacture of the desired matting article in a relatively direct and simple manner while ensuring a strong, coherent matting product of the specified properties.

In accordance with the invention, these objects have been achieved by use of a special process and apparatus described and claimed in detail hereafter so as to provide an improved low density matting article having (a) a primary matting layer consisting essentially of a plurality of continuous melt-spun synthetic polymer filaments of a diameter of about 0.1 to 1.5 mm., preferably between about 0.2 and 1 mm., laid in overlapping rows of irregularly looped and intermingled filaments to form a peak and valley three-dimensional sheet structure undulating in the longitudinal and/or transverse directions of the matting, the individual filaments in said structure being self-bonded at random points of intersection to provide a transverse strength per unit of surface weight of at least 2 Nm/g, preferably at least about 4 Nm/g, said primary layer having a thickness of about 5 to 70 mm and a surface weight per unit thickness of less than 50,000 g/m$^3$, preferably less than 40,000 g/m$^3$; and (b) a secondary footing layer or "sole" consisting essentially of a substantially flat, thin nonwoven web of synthetic polyer filaments melt-spun as a separate sheet and then applied onto one of the undulating faces of said primary matting layer while still tacky such that the surface filaments of the nonwoven web become bonded to part of the filaments of said primary matting layer at mutual points of intersection, said footing layer having a substantially lower porosity than said primary matting layer.

This matting article has one side which is normally in a face-up position and can be readily filled, while the other normally face-down side is a relatively dense footing layer or "sole" which, on the one hand, provides better protection against washing out of the filled material and, on the other hand, also facilitates root growth through the matting layer and sole for better erosion control. The smaller pores or voids in the sole, compared with those in the primary matting layer proper, offer the possibility of still further increasing the pore size of the primary matting layer so as to improve its filling capacity and total filling volume.

The diameters of the filaments of the nonwoven web forming the sole may fluctuate within wide limits and, in particular, may be much smaller than those of the filaments of the sheet matting. However, it is especially advantageous to also use macrofilaments to form the nonwoven web, preferably using filaments of approximately the same diameter as the filaments of the primary matting.

The thickness of the nonwoven web forming the footing layer or sole should be as small as possible, preferably between about 1 mm and 4 mm. In general, the footing layer or sole should be less than 20% of the thickness of the primary matting layer and preferably less than about 10% of the thickness of the primary layer. A substantially greater thickness would lead to an undesirable increase in the weight per unit area, a reduction in the density, i.e. the surface weight per unit thickness, and/or a reduction in the transverse strength per unit of surface weight.

The nonwoven web of the footing layer may be composed of the same synthetic fiber-forming polymer as the primary matting layer, but when using separate spinning plates or spinnerets, different polymers can be used. The strength of the bonding points and, hence, the transverse strength of the total matting article can be controlled by judicious selection of the polymers for both the primary matting layer and the nonwoven web of the footing layer. As in copending application Ser. No. 703,277, one can choose individual filaments in each layer from the usual synthetic thermoplastic polymers, especially the fiber-forming polymers such as nylon and especially polycaprolactam.

The preferred matting articles are those in which the three-dimensional structure of the primary matting layer undulates in both longitudinal and transverse direction, e.g. so as to provide a waffle-like face structure of peaks and valleys in the finished article even though it is completely free of bonding agents, impregnants, reinforcing inserts or the like and also without any compression or flattening of the matting to achieve this waffle-like appearance. In most cases the undulations are created by peaks and valleys running longitudinally and transversely of the elongated matting sheet. However, these peaks and valleys may also run diagonally of the matting to fall within the scope of undulations defined as running "longitudinally and/or transversely" of the matting.

The process of the present invention adopts in part the process carried out in our earlier filed application, Ser. No. 703,277 for the manufacture of a low density matting structure by extruding the melt of a synthetic polymer through a plurality of spinning orifices, arranged in rows on the bottom face plate of a spinning nozzle or spinneret, said orifices having a diameter preferably exceeding about 0.2 mm., such that a corresponding plurality of melt-spun filaments fall vertically downwardly onto a moving support intersecting the filaments at a distance of about 3 to 20 cm., preferably 3 to 9 cm., below the spinning plate. Said moving support exhibits a profile having projections of a depth of about 5 to 70 mm, corresponding to the desired depth of the mattings and arranged to provide a patterned reentrant supporting surface with uppermost salient portions onto which the filaments are first directed and supported so as to form the peaks of said matting structure and with downwardly opening reentrant areas between said salient portions into which filamentary loops are directed both longitudinally and transversely so as to form the valleys of said matting structure, the filaments from adjacent spinning orifices overlapping and self-bonding with each other at random points of intersection. The matting is then finished by cooling and solidifying the freshly deposited and self-bonded filaments while continuously transporting the matting away from the spinning nozzle on the moving support, thereafter removing the cooled and solidified matting from the moving support.

For the manufacture of the matting article according to the present invention, this earlier disclosed process is modified by spinning a melt of a synthetic polymer from an additional set of spinning orifices onto a second and different moving support having an essentially smooth and even surface structure, thereby forming a substantially flat nonwoven web of overlapped filamentary loops self-bonded at random points of intersection. This nonwoven web, is made substantially thinner and with a substantially lower porosity, i.e. fewer open spaces or voids, than the primary matting structure.

The nonwoven web is then transferred while still tacky from the second moving support directly onto the free surface of the matting sheet structure as the latter is carried while still tacky on the first moving support. At the same time, the nonwoven web is lightly pressed against the free surface of the matting sheet structure such that part of the tacky surface filaments in the contacting face portions of the web and the matting adhere to each other at mutual points of intersection. Finally, the combined web and matting are cooled on the first moving support to firmly bond the adhered filaments to each other.

In this new process, the spun filaments of both the matting and the nonwoven web preferably have a diameter of about 0.1 to 1.5 mm., and especially more than about 0.2 mm. up to about 1 mm. These so-called "macrofilaments" offer an especially coherent and strong matting article.

Various kinds of moving supports can be employed, as described in much greater detail in copending Ser. No. 703,277, but especially good results have been obtained by forming the thin nonwoven web on a smooth surfaced cylindrical roller as the second moving support which then presses the web lightly against the free surface of the thicker matting carried on the first moving support. The first moving support is advantageously in the form of a much larger cylindrical drum or roll, with a highly profiled surface to form the peak and valley structure of the undulating matting structure. It will be noted that this undulating structure, e.g. preferably a waffle-like structure, is maintained in the matting as the nonwoven web is lightly pressed thereon while both web and matting are still tacky and adherent. Once this contact and adherence under light pressure is completed, then the matting article can be further cooled and solidified, e.g. by cooling air or a cooling of the first moving support, and only then taken up on a winding spool or other collection and/or storage means.

The invention further includes apparatus to manufacture the improved matting article and to carry out the process of the invention, said apparatus including at least one spinning plate or spinneret means with a plurality of spinning orifices, a first moving support element or means such as a roller, drum, conveyor belt or the like having an upper profiled surface and located at a predetermined distance below a first set of spinning orifices, the freshly spun filaments being deposited on said profiled surface to form the correspondingly profiled matting layer, preferably with means for cooling and winding or collecting the formed matting article. This apparatus is characterized and distinguished according to the invention by its combination with an essentially smooth surfaced roller, which is rotatably mounted between the spinneret means and the first moving support means in proximity to the profiled surfaced of said first support means, so that a second group of the filaments melt-spun from a second set of spinning orifices of the spinneret means is directed onto the smooth surfaced roller as it moves in a direction counter to the first profiled support means.

In a preferred version of the apparatus, the smooth surfaced roll is pressed lightly against the first profiled support means and is friction driven by this profiled support means.

The invention will be more fully understood from the following description and claims taken together with the accompanying drawings wherein:

Figure 4:
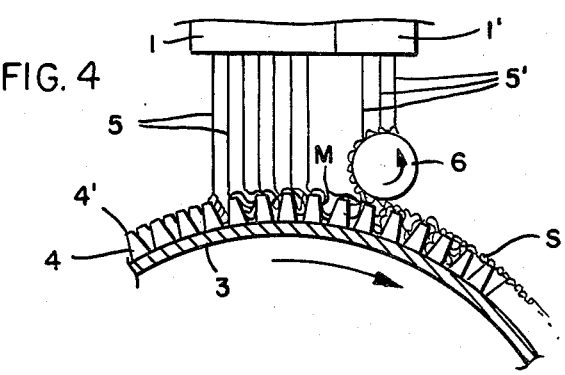
Figure 5:
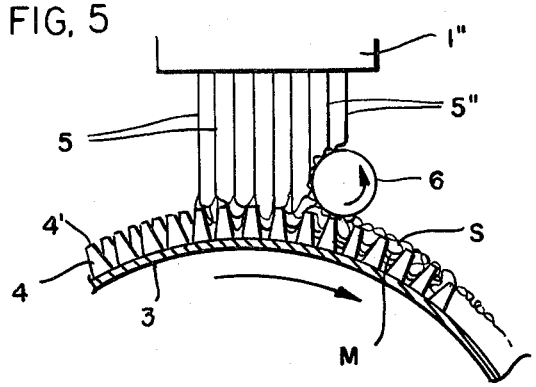
Figure 6:
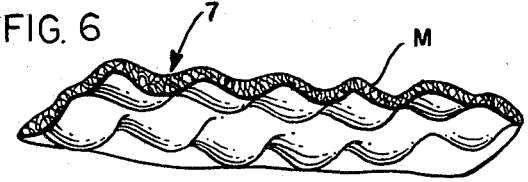

FIGS. 4 and 5 each illustrate in a partial view two different variations of the process and apparatus of the invention for the manufacture of the layered matting article;

FIG. 6 is a perspective view of the primary matting layer by itself; and

Figure 7:
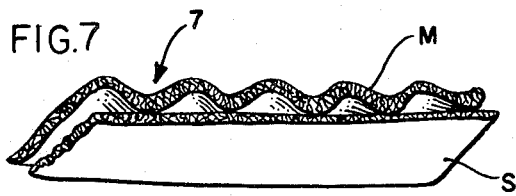

FIG. 7 is a corresponding perspective view of a matting article of the invention with the nonwoven footing layer added to the primary matting layer.

Figure 1:
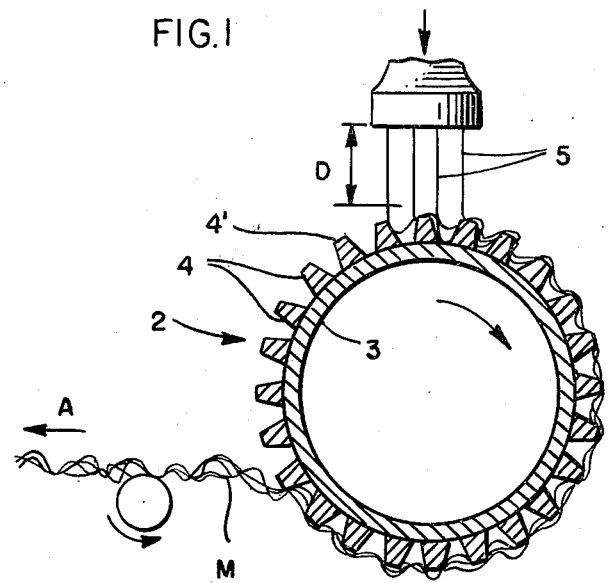
FIG. 1 is a schematic and partial cross-sectional view of a profiled roll or drum as a first moving support positioned below a spinneret to form the primary matting layer according to the invention.
Figure 2:
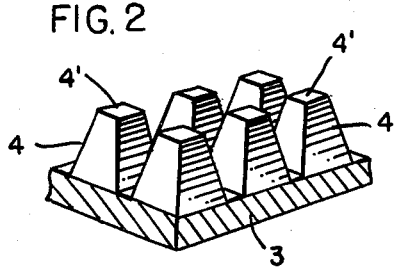
FIG. 2 is an enlarged perspective view of a small section of truncated four-sided pyramids used as preferred projections on the moving support used to form the primary matting layer.
Figure 3:
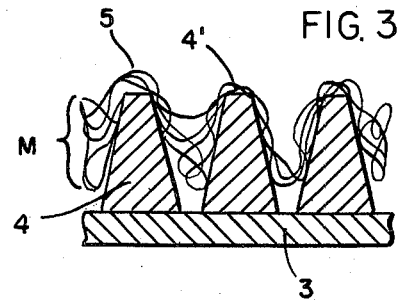
FIG. 3 is a cross-section taken longitudinally through the projections of FIGS. 1 and 2 after deposition of the filaments.

Referring first to FIGS. 1-3, the apparatus is substantially the same as that used for the manufacture of the undulating matting sheet as set forth in copending application, Ser. No. 703,277.

At the distance D from the bottom face plate of spinneret 1, a hollow cylindrical roll or drum 2 having a base rim 3 with the profiled projections 4 around its periphery is aligned in such a manner that the four rows of filaments 5 being melt spun from the spinneret 1 are deposited on and between the projections 4 (see FIG. 3). The procedure followed is the same as described on pages 18-23 of said copending application, including normal transport speeds of about 2 to 10 m/mm and the use of an axially reciprocating roll or drum with an amplitude or stroke distance of about 3 to 10 mm and a frequency of about 80 to 300 strokes per minute.

In this manner the deposited filaments 5 form the primary matting sheet M, which after cooling is withdrawn from the roll and travels in direction of arrow A to winding take-up or collection means (not shown).

The projections 4, as in the copending application, may assume the shape of a truncated cone, a truncated pyramid, a hemisphere, a nail or screw with a prominent head, or the like mounted in the surface of the base rim 3 of drum 2. When using a large drum 3, the profiles 4 offer upper peaks 4' falling in a slightly curved plane so that D fluctuates by a small increment over the four rows of filaments 5. For practical purposes, however, this slightly curved plane provides an approximate horizontal intersection with the vertically falling filaments. The filaments fall on top of each profiled projection and then extend in a random manner into the reentrant or valley portions between the projections in the form of overlapping and intermingled loops, at least some of these loops being directed transversely of the drum as well as longitudinally during the rotation of the drum.

FIG. 2 illustrates an especially preferred profile composed of the truncated pyramids 4. As further shown in FIG. 3, the continuous looped filaments 5 are deposited on the flattened peaks or upper salient portions 4' of the truncated pyramids 4 and also in the valleys between truncated pyramids 4 to form the three-dimensional, waffle-shaped matting M.

The manufacture of the complete matting article according to the present invention is explained with the aid of FIG. 4 which illustrates one technique for applying the footing layer or "sole" S to the primary matting M. As in the process according to our copending application, the formation of the primary matting layer M is accomplished by a number of rows of filaments 5 e.g. seven rows, from a first spinneret 1 vertically downwardly onto the moving support element, i.e. roll or drum rim 3 with its projections 4. Between another spinneret 1', which can be part of spinneret 1 or else can be mounted adjacent thereto as a second spinneret—and the depositing element, an essentially smooth roller 6 is rotatably mounted in such a manner that the spun filaments 5' of spinneret 1' are deposited as a thin, flat, nonwoven web or sheet on the roller surface S moving counter to the rotational movement of the much larger support drum 3. The nonwoven sheet S is lightly pressed at the same time onto the freshly formed matting M while the filaments of both matting and nonwoven are still tacky and readily adherent to each other. During cooling of both of these layers or sheet structures, the filaments of nonwoven sheet S fuse or bond to the filaments of matting M at surface contact points. The roller 6 should be quite small in diameter since it does need to handle more than a few rows of filaments 5' and at the same time is preferably arranged in the gap space between the spinnerets 1 or 1' and the larger moving drum support 3. Where the gap space between the drum 3 and spinneret 1 is very small, the second spinneret 1' and roller 6 can be removed farther to one side. However, it is essential that the filaments 5 and 5' remain tacky and adherent while being pressed together along the contacting surface portions of the nonwoven sheet S and the primary matting M.

Another variation of the process and apparatus of the invention is illustrated in FIG. 5. In this case, a single large spinneret 1" is used to spin identical filaments which are deposited partly as filaments 5 to form the matting M on projections 4 and partly as filaments 5" to form the nonwoven sheet S on smooth roll 6. Here again, the roller 6 is of much smaller diameter than drum 3 and is counter driven by frictional contact with the drum 3 as the still tacky surface filaments of both the nonwoven sheet S and the primary matting M are pressed lightly together.

Cooling of the resulting two-layer matting article can be accomplished simply by air cooling at ambient temperatures or by passing a cooling stream of air over the matting article as it is transported around the drum 3. As in our copending application, the drum may also be internally cooled to provide indirect heat transfer, i.e. to withdraw heat from the projections 4 and the rim 3.

FIG. 6 illustrates the matting M as obtained by spinning filaments onto a profiled surface consisting of projecting hemispheres. The hemispherical cavities 7 of this matting M are subsequently filled with sand, gravel, soil or similar fillers.

FIG. 7 illustrates the finished matting article of the invention including the primary matting layer M and the spun nonwoven web or sheet S as a "sole" or footing layer. This matting article is subsequently laid out and used for soil retention purposes with the sole facing down on the ground. The cavities 7 are then filled later on to hold the matting in place. This sole S has a very small size of pores or open spaces as compared to the primary matting M, e.g. the proportion of voids being substantially less than 50% and even as little as 10% or less.

The invention is further illustrated but not to be limited by the following examples.

EXAMPLE 1

Polycaprolactam is spun as a large number of macrofilaments from 7 rows of spinning orifices of a spinneret onto a rotating drum provided with truncated pyramids to form a primary matting layer with a waffle-like surface structure. On an essentially smooth and even roller, friction-driven by the drum as in FIG. 4, another group of macrofilaments is spun from 3, 4, 5 or 6 rows of spinning orifices to form an essentially flat nonwoven web or sheet which is surface bonded to the structured primary matting sheet as the two sheets are squeezed slightly between the drum and roller. Spinning and drawoff speeds are adjusted so that the matting with its applied sole or footing layer according to the invention has a total weight per unit area (surface weight) of 400, 500 or 600 g/m².

Each matting article as a finished product has a total thickness of 15 mm. The properties of these products are listed in the following Table I.

TABLE I

| Exp. No. | No. of Orifice rows for: | | Weight per unit area g/m² | Surface weight per unit thickness g/m³ | Transverse strength per unit surface weight Nm/g |
|---|---|---|---|---|---|
| | Matting | Sole | | | |
| a1 | 7 | 3 | 400 | 26,000 | 4.0 |
| a2 | 7 | 3 | 500 | 33,300 | 4.83 |
| a3 | 7 | 3 | 600 | 40,000 | 5.98 |
| b1 | 7 | 4 | 400 | 26,000 | 4.35 |
| b2 | 7 | 4 | 500 | 33,300 | 4.83 |
| b3 | 7 | 4 | 600 | 40,000 | 6.51 |
| c1 | 7 | 5 | 400 | 26,000 | 3.95 |
| c2 | 7 | 5 | 500 | 33,300 | 5.28 |
| c3 | 7 | 5 | 600 | 40,000 | 5.48 |
| d1 | 7 | 6 | 400 | 26,000 | 4.63 |
| d2 | 7 | 6 | 500 | 33,300 | 5.51 |
| d3 | 7 | 6 | 600 | 40,000 | 5.78 |

EXAMPLE 2

Polycaprolactam macrofilaments are spun from a total of 10 rows of spinning orifices of a spinneret. The number of rows for the formation of the structured primary matting layer is reduced from 7 to 4, whereas the number of rows for the formation of the flat nonwoven web layer is increased from 3 to 6. As in Example 1, the spinning and drawoff speeds are adjusted so that a matting article with a thickness of 15 mm is formed in each case. Mattings suitable as soil retention structures are obtained with the properties listed in the following Table II.

TABLE II

| Exp. No. | No. of Orifice rows for: | | Weight per unit area g/m² | Surface weight per unit thickness g/m³ | Transverse strength per unit surface weight Nm/g |
|---|---|---|---|---|---|
| | Matting | Sole | | | |
| e1 | 7 | 3 | 400 | 26,000 | 4.0 |
| e2 | 7 | 3 | 500 | 33,300 | 4.83 |
| e3 | 7 | 3 | 600 | 40,000 | 5.98 |
| f1 | 6 | 4 | 400 | 26,000 | 4.5 |
| f2 | 6 | 4 | 500 | 33,300 | 5.27 |
| f3 | 6 | 4 | 600 | 40,000 | 6.44 |
| g1 | 5 | 5 | 400 | 26,000 | 4.15 |
| g2 | 5 | 5 | 500 | 33,300 | 5.2 |
| g3 | 5 | 5 | 600 | 40,000 | 6.3 |
| h1 | 4 | 6 | 400 | 26,000 | 5.5 |
| h2 | 4 | 6 | 500 | 33,300 | 7.55 |
| h3 | 4 | 6 | 600 | 40,000 | 7.79 |

All of the matting articles produced in Examples 1 and 2 exhibit an excellent bond between the structured matting layer and the flat sole or footing layer. This bond is formed by the surface filaments of each layer which contact each other when the layers lightly pressed together between the drum and roller moving supports. Even though only the peaks or projecting portions of the matting layer are adhered to the footing layer, a very strong cohesive bonding is achieved. Separating the footing layer from the matting layer is possible only by destruction of the total matting article. The mattings retain a very low overall density or surface weight per unit thickness even though the relative transverse strength has been substantially increased. Also, a large filling capacity is retained while providing a better retention with the strongly attached sole or footing layer. The process and apparatus for the manufacture of the multilayered products of the invention are simple to provide and economical to operate.

The invention is hereby claimed as follows:

1. A coherently self-bonded, low density matting article comprising:

(a) a primary matting layer consisting essentially of a plurality of continuous melt-spun synthetic polymer filaments of a diameter of about 0.1 to 1.5 mm. laid in overlapping rows of irregularly looped and intermingled filaments to form a peak and valley three-dimensional sheet structure undulating in the longitudinal and/or transverse directions of the matting, the individual filaments in said structure being self-bonded at random points of intersection to provide a transverse strength per unit of surface weight of at least 2 Nm/g, said primary layer having a thickness of about 5 to 70 mm and a surface weight per unit thickness of less than 50,000 g/m³; and (b) a secondary footing layer consisting essentially of a substantially flat, thin nonwoven web of synthetic polymer filaments melt-spun as a separate surface sheet and then immediately applied onto one of the undulating faces of said primary matting layer while still tacky such that the freshly melt-spun surface filaments of the nonwoven web become bonded to part of the filaments of said primary matting layer at mutual points of intersection, said footing layer having a substantially lower porosity than said primary matting layer.

2. A matting article as claimed in claim 1 wherein the surface weight per unit thickness of the primary matting layer is less than 40,000 g/m³.

3. A matting article as claimed in claim 1 wherein the filaments of the footing layer have approximately the same diameter as the filaments of the matting layer.

4. A matting article as claimed in claim 1 wherein the footing layer has a thickness of between about 1 and 4 mm.

5. A matting article as claimed in claim 1 wherein the filaments of both the footing layer and the primary matting layer are nylon filaments.

6. A matting article as claimed in claim 1 wherein the filaments of both the footing layer and the primary matting layer are polycaprolactam filaments.

7. A matting article as claimed in claim 1 wherein the primary matting layer in combination with the secondary footing layer has a transverse strength per unit weight of at least about 4 Nm/g.

8. A matting article as claimed in claim 1 wherein the primary matting layer undulates in both longitudinal and transverse directions to provide a waffle-like face structure of peaks and valleys, said footing layer being bonded by surface filaments to the peak portions of the waffle-like matting face.

9. A matting article as claimed in claim 8 wherein the primary matting layer in combination with the secondary footing layer has a transverse strength of at least about 4 Nm/g.

10. A matting article as claimed in claim 9 wherein the filaments of both the footing layer and the primary matting layer are nylon filaments of approximately the same diameter between about 0.2 and 1 mm.

* * * * *

UNITED STATES PATENT AND TRADEMARK OFFICE
CERTIFICATE OF CORRECTION

PATENT NO. : 4,177,312
DATED : December 4, 1979
INVENTOR(S) : Rasen et al

It is certified that error appears in the above—identified patent and that said Letters Patent are hereby corrected as shown below:

On the front page of the patent, after "[22] Filed: May 8, 1978"

insert --[30] Foreign Application Priority Data
May 6, 1977 [DE] Fed. Rep. of Germany.....2720403--

Signed and Sealed this

First Day of April 1980

[SEAL]

Attest:

SIDNEY A. DIAMOND

Attesting Officer

Commissioner of Patents and Trademarks